(12) United States Patent
Aalerud et al.

(10) Patent No.: US 12,541,095 B2
(45) Date of Patent: Feb. 3, 2026

(54) REFLECTOR FOR REFLECTING ELECTROMAGNETIC WAVES FROM A ROTATING ELECTROMAGNETIC WAVE SOURCE

(71) Applicant: UNIVERSITETET I AGDER, Kristiansand (NO)

(72) Inventors: Atle Aalerud, Arendal (NO); Joacim Dybedal, Kristiansand (NO)

(73) Assignee: Universitetet i Agder, Kristiansand (NO)

( * ) Notice: Subject to any disclaimer, the term of this patent is extended or adjusted under 35 U.S.C. 154(b) by 1252 days.

(21) Appl. No.: 17/414,963

(22) PCT Filed: Dec. 18, 2019

(86) PCT No.: PCT/EP2019/085928
§ 371 (c)(1),
(2) Date: Jun. 17, 2021

(87) PCT Pub. No.: WO2020/127469
PCT Pub. Date: Jun. 25, 2020

(65) Prior Publication Data
US 2022/0163791 A1    May 26, 2022

(30) Foreign Application Priority Data
Dec. 21, 2018  (NO) .................................. 20181674

(51) Int. Cl.
| G02B 26/12 | (2006.01) |
| G01S 7/481 | (2006.01) |
| G01S 17/08 | (2006.01) |

(52) U.S. Cl.
CPC ............ *G02B 26/12* (2013.01); *G01S 7/4817* (2013.01); *G01S 17/08* (2013.01)

(58) Field of Classification Search
CPC ....... G02B 26/12; G01S 7/4817; G01S 17/08; G01S 7/027; G01S 17/86; G01S 7/4808; G01S 7/4812
See application file for complete search history.

(56) References Cited

U.S. PATENT DOCUMENTS

| 8,744,741 | B2 | 6/2014 | Brimble et al. |
| 2012/0113537 | A1 | 5/2012 | Minano et al. |
| 2015/0055117 | A1 | 2/2015 | Pennecot et al. |
| 2016/0334093 | A1 | 11/2016 | Stack et al. |
| 2017/0365068 | A1* | 12/2017 | Tan .......................... G06T 3/14 |

* cited by examiner

*Primary Examiner* — Tony Ko
(74) *Attorney, Agent, or Firm* — Christian D. Abel

(57) ABSTRACT

A reflector for reflecting electromagnetic waves from a rotating electromagnetic wave source comprises a reflective screen shaped as a hollow truncated cone having a top at the truncated end and a base, where the radius of the top is smaller than the radius of the base. The hollow truncated cone comprises a plurality of trapezoid shaped segments, where the screen has a reflective material on the trapezoid shaped segments inside the hollow cone.

12 Claims, 9 Drawing Sheets

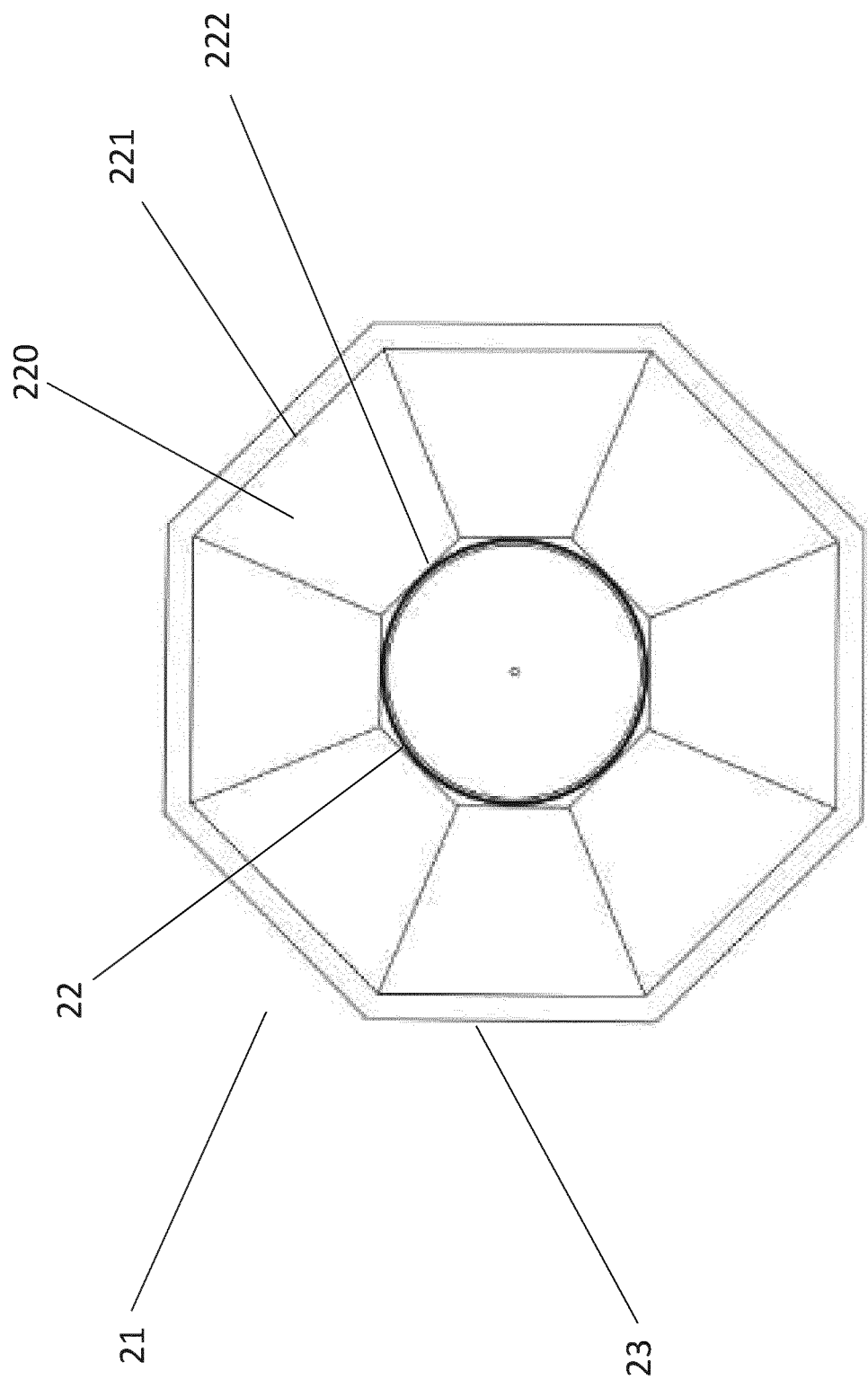

REFLECTOR FOR REFLECTING ELECTROMAGNETIC WAVES FROM A ROTATING ELECTROMAGNETIC WAVE SOURCE

The invention regards a reflector for reflecting electromagnetic waves from a rotating electromagnetic wave source, for example a lidar.

LiDAR, which stands for Light Detection and Ranging, uses laser pulses to take measurements and generate a 3D map of an environment. After the unit sends out a laser pulse, a sensor on the instrument measures the amount of time it takes for the pulse to bounce back. As light moves at a constant speed, the lidar unit is able to accurately calculate the distance between itself and the target.

Lidar's advantage over other sensors lies in its comprehensive data collection. Many applications, for example area monitoring and autonomous vehicle technology demands an accurate and abundant amount of data. Lidar carries more information from each data point than other sensors, including x, y, and z coordinates, time, and reflectivity (the amount of reflected light or radiation produced by an object). Most license plates, street signs, and even street line paint have retro-reflective surfaces, which provide a larger laser return signal.

Modern three-dimensional lidar scanners were invented in the mid-2000s. In recent years, however, there has been common opinion that this design—which involves mounting a number of lasers, for example 8, 16, 32, 64 or 128, onto a rotating gimbal—would soon be rendered obsolete by a new generation of solid-state lidar sensors that use a single stationary laser to scan a scene.

However, the classic spinning design has still some advantages. The most obvious one is the 360° field of view. You can stick one lidar unit on the top of a car and get a complete view of a car's surroundings. Solid state lidars, in contrast, are fixed in place and typically have a field of view of 120° or less. It typically takes at least four units to achieve comparable coverage with a solid-state sensor.

Another less obvious advantage is that eye safety rules allow a moving laser source to emit at a higher power level than a stationary one.

With a scanning solid-state unit, putting your eye inches from the laser scanner could cause 100 percent of the laser light to flood into the eye. But with a spinning sensor, the laser is only focused in any particular direction for a fraction of its 360° rotation. A spinning lidar unit can therefore put more power into each laser pulse without creating risk of eye damage. That makes it easier to detect return flashes, so spinning units may have a range advantage over stationary ones for the foreseeable future.

However, if the user application requires beams directed towards a target, using the spinning lidar directly will be inefficient as most of the light is not directed towards the target. Thus, most of the data carried by the light will be wasted and the cost of the useful data will be very high. It is therefore a need for a solution that makes use of all or most of the light from the rotating light beam.

U.S. Pat. No. 8,094,393 describes a grooved reflector for light concentration for a non-collimated light source. The device contains grooved structures that with two reflections couple the rays of two given wave fronts exactly, with no limitation about the groove size. This device is not suitable for measuring light reflected back from the target.

US20160334093 describes a light source consisting of several non-rotating LED spots. Each of the LED spots can be placed in a trunked tapered housing to improve the total lighting from the entire light source.

US20170365068 shows a device for measuring the depth of an object using LiDAR. The publication shows a mirror arrangement to concentrate the beams from the LiDAR.

The object of the invention is to provide a reflector device that maintains the advantages of the spinning lidar while providing a collected lidar beam which may be directed towards a target. A such lidar beam will ensure that all or most of the lidar beam is directed towards the target and thus having knowledge also of the beam reflected from the target.

Although the discussion above is focused on the use of a rotating lidar, some of the same discussion would be valid for other sources of electromagnetic waves, such as radar or other radio waves. The invention is not limited to use with lidar, but may be used with any suitable rotating electromagnetic wave source.

The object of the invention is achieved by means of the features of the patent claims.

In one embodiment, a reflector for reflecting electromagnetic waves from a rotating electromagnetic wave source comprises a reflective screen being shaped as a hollow truncated cone having a top at the truncated end and a base at the opposite end of the truncated end. The radius of the top is smaller than the radius of the base.

The reflective screen has a reflective material inside the hollow cone. The reflective material may be a metal coating, or other suitable material providing reflectivity of the electromagnetic waves. The hollow truncated cone comprises a plurality of trapezoid shaped segments, where the reflective material is arranged on the trapezoid shaped segments inside the hollow cone. The reflective material may be deposited on front or back surface of glass, metal or other material.

The trapezoid shaped segments may be arranged with their broad base at the base of the hollow truncated cone and the short base at the top of the truncated cone. The trapezoid shaped segments may be arranged with their side edges in contact with each other. In order to ensure a close fit at the side edges, it may be advantageous to fit the side edges of neighboring segments together for example by means of mitre joints. When the beam from the electromagnetic wave source hits the joints between two neighboring segments, reflections from both signals will occur, leading to possible errors. These signals may thus be discarded. The number of joints will thus affect the signal quality and the number of trapezoid shaped segments may be adapted to the planned use and/or need for signal quality. In one embodiment, there are arranged eight trapezoid shaped segments adjacent to each other, but here may be less or more than eight segments. More segments will lead to more joints, but will give a better fit to the cone. If the width of the segments is smaller than the width of the beam, the beam will always be reflected from two segments. The segments should thus never be smaller than the beam width. In one embodiment the slant angle of the cone is adapted to be operative to transfer light between a source arranged in the top of the truncated cone and a target in front of the base of the truncated cone. The slant angle may be adapted to the use of the reflector and the desired angle of emersion, ie. the desired direction/angle with which the waves leave the reflector. Different sources may emit waves with different angles, which also may influence the choice of slant angle of the cone.

Each of the trapezoid segments may be arranged with the same slant angle or they may have different, individual slant angles inside the cone. Choosing slant angles of the individual trapezoid segments, can be used to optimize the distribution of the electromagnetic waves on the target.

When each trapezoid segment has the same slant angle, the distribution of the electromagnetic waves on the target is symmetrical, while different slant angles will provide a shifted or asymmetric pattern provided by the electromagnetic waves. This can be used in cases where it is preferable to have a higher density of electromagnetic waves in specific areas and lower density in other areas. In this way it may be created unique patterns and distribution of the electromagnetic waves for specific uses.

In an alternative embodiment, the reflective screen comprises a plurality of grooves inside hollow cone, where each groove is formed by two reflective facets meeting at an edge. The grooves extend radially from a defined point in the top of the truncated cone. The defined point may be adapted to the use and the intended placement of the rotating electromagnetic wave source. For example, if the rotating electromagnetic source is to be placed with its center axis coinciding with the center axis (symmetry axis) of the cone, the grooves may extend from the center of the cone. In another embodiment, the screen may be adapted for placing the rotating electromagnetic source off-center in the cone, and then the defined point from which the grooves extend may be off-center and lie on the center axis of the rotating electromagnetic source. The grooves may be arranged as a separate film inside the hollow cone, or may be integrated in the hollow cone, for example by producing the reflective screen with grooves.

The internal angle of the grooves, ie. the angle between the two reflective facets, is in one embodiment 90° along the complete length of the groove.

The reflective material may be adapted to the wavelength of the electromagnetic waves that is to be reflected by the reflector, ie. a material with suitable index of refraction should be selected. According to optical laws, total internal reflection occurs when a propagated wave strikes a medium boundary at an angle larger than the critical angle (with respect to the normal to the surface). The critical angle is the thus the angle of incidence above which total internal reflection occurs.

The number of grooves may be adapted to the use of the reflector.

In one example embodiment of a reflector, the angle between the grooves can be 9° or any integer by which 360 is divisible. An example of a source is a rotating lidar emitting 16 beams.

As the angle between the reflective facets is constant over the length of the groove, the depth of the groove will be larger at the base than at the top of the truncated cone. To prevent the depth from being too large, the reflective screen with reflective material comprises at least two sectors, where each sector comprises a set of radially extending grooves. The sectors are arranged perpendicular to the radially extending grooves, with the sectors having a border running along the complete circumference of the cone. The number of sectors can vary according to the use of the reflector, and typically larger reflectors, will have more sectors than small reflectors. The number of sectors may also be adapted to the desired depth of the grooves, as more sectors will enable more shallow grooves.

The waves emitted from the source is then totally internally reflected at the two facets forming the grooves of the reflector and directed to the target.

The source may be arranged centrally in the cone, or it may be arranged off-center. As the wave source rotates and the waves are reflected by the grooves, the reflections will be distributed as "points" forming an imaginary line in an imaginary target plane. Arranging the source off-center will create an ellipsoidal pattern of reflected light, while a center arranged source will create a circular pattern.

In the case of an off-center arrangement, the radial pattern of the grooves may also be radially distributed based on this off-center point, ie. the radially extending grooves having their imaginary starting point extending from the center of the source. An ellipsoidal pattern can be used to compensate for the distribution of lines on a slanted surface such as when the sensor arrangement is tilted down towards a floor.

In one embodiment, it is provided an arrangement which comprises the rotating electromagnetic source and a reflector as described above.

The invention will now be described in more detail, and by reference to the accompanying figures.

FIG. 2a illustrates the design of the reflector according to the invention.

Figure 1:
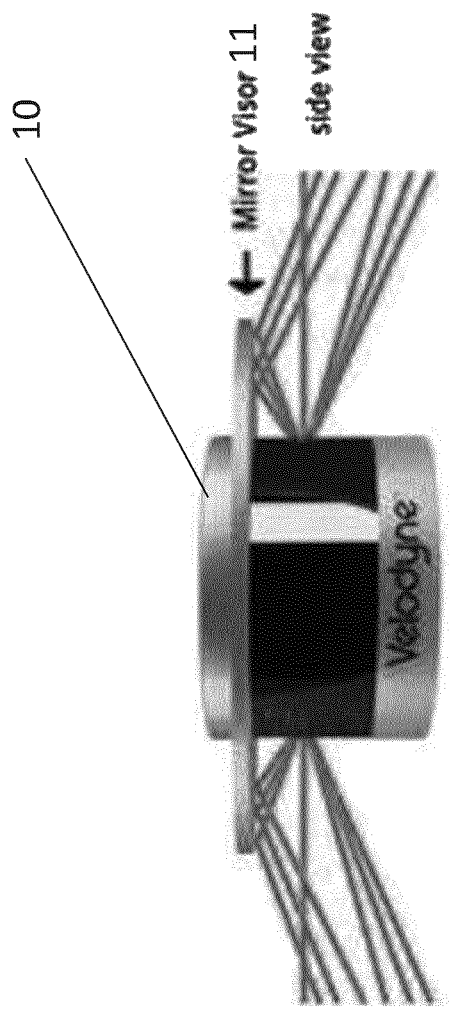
FIG. 1 shows the principle of a prior art standard rotating lidar.

In FIG. 1 it is illustrated a prior art standard rotating lidar 10, which is an example of an electromagnetic source which may be used with a reflector according to the invention. In this example it is shown a Velodyne VLP-16 LiDAR sensor. As the lidar 10 rotates, the beams are emitted with an angle of dispersion such that some of the beams are directed angled upwards and downwards.

As is evident from the figure, the lidar is in this configuration arranged with a reflector in form of a flat mirror 11 arranged over the emitted laser beams. The most upward angled beams will be reflected by the mirror, thus directing more of the beams downwards and spread the beams. The reflector according to the invention, in contrast, is designed to reflect all the beams from the source in one direction.

Figure 2:
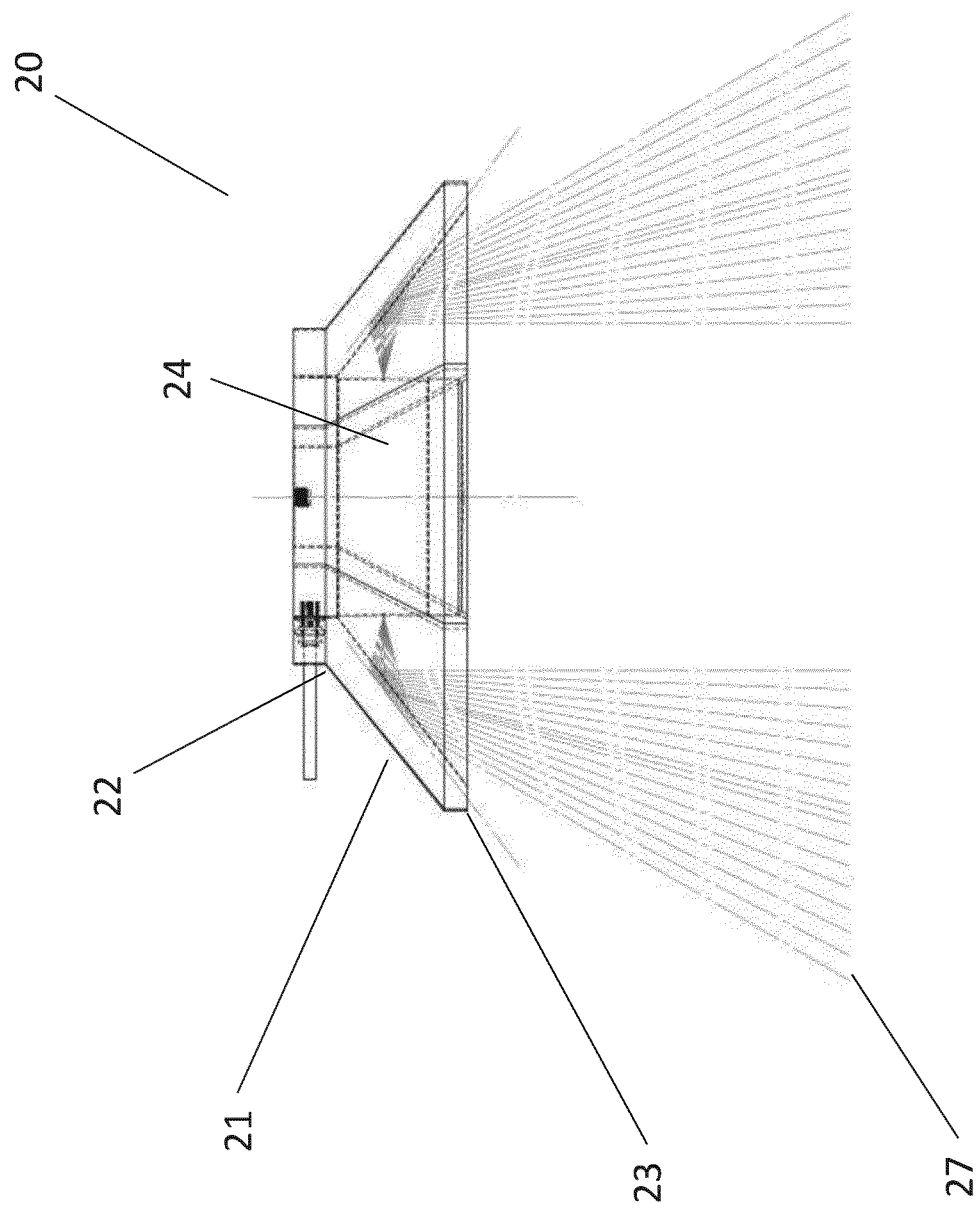
FIG. 2 illustrates one embodiment of a reflector according to the invention.

FIG. 2 illustrates one embodiment of a reflector 20 according to the invention. The reflector 20 comprises a reflective screen 21 which is shaped as a hollow truncated cone having a top 22 at the truncated end and a base 23 at the opposite end of the truncated end. The radius of the top 22 is smaller than the radius of the base 23.

The reflective screen 21 has a reflective material at the inside walls of the hollow cone. The inside of the hollow cone forms a cavity, and a rotating electromagnetic wave source 24 is arranged in the cavity, emitting electromagnetic waves towards the reflective material of the inside walls. The rotating electromagnetic wave source 24 is for example the Velodyne LiDAR of FIG. 1 without the flat reflector.

The reflective screen, ie. the hollow truncated cone, comprises in this embodiment a plurality of trapezoid shaped segments. The electromagnetic waves are reflected at the trapezoid segments and the waves are thus transferred from the source 24 towards 27 a possible target arranged in front of the base of the truncated cone.

FIG. 2a illustrates how the trapezoid shaped segments 220 are arranged to form the hollow truncated cone. In this embodiment the truncated cone comprises eight trapezoid shaped segments 220, each arranged with their broad base 221 at the base 23 of the hollow truncated cone, and the short base 222 at the top 22 of the cone. The screen has a reflective material on the trapezoid shaped segments inside the hollow cone.

Figure 2B:
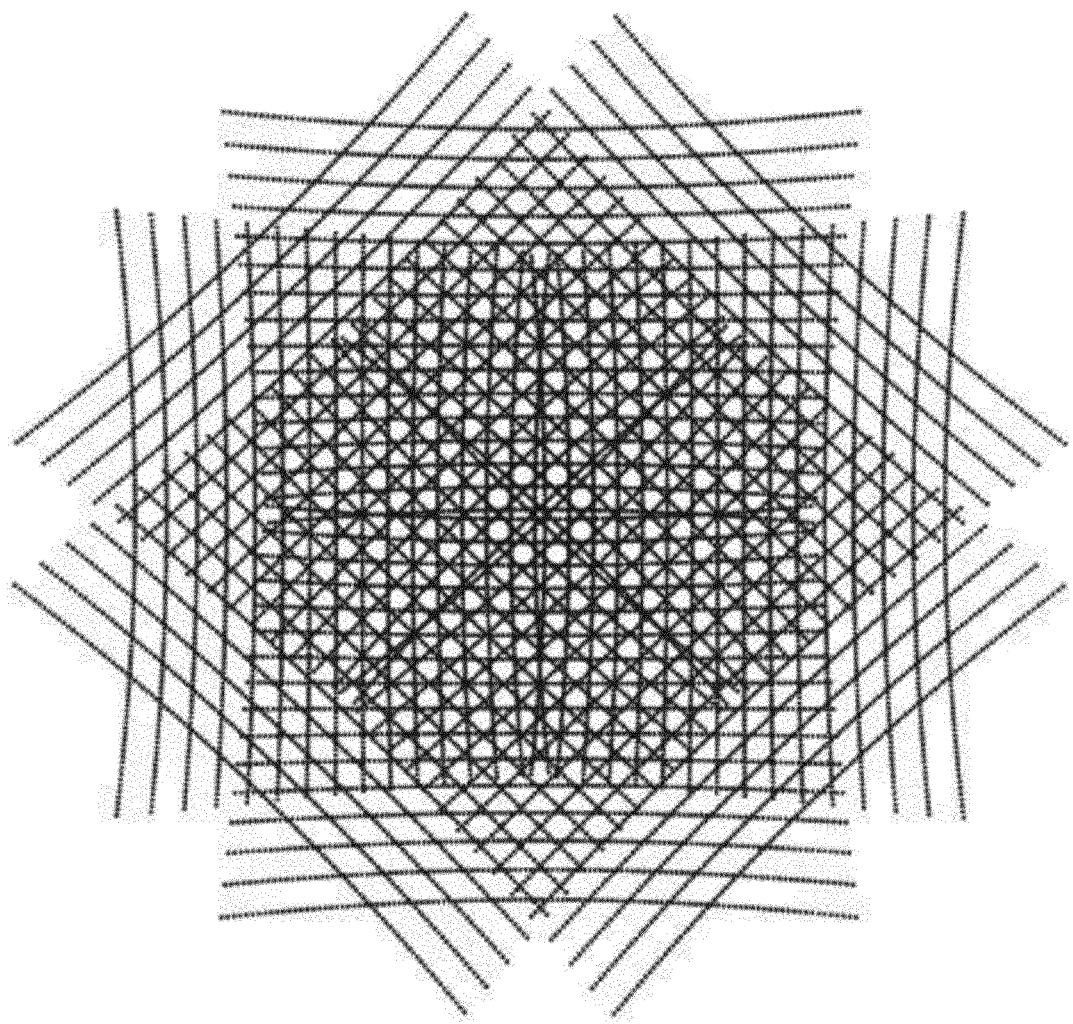
FIG. 2b illustrates the pattern formed by the electromagnetic waves at a target plane when reflected by the reflector according to the invention.

FIG. 2b illustrates the pattern formed by the electromagnetic waves at a target plane when reflected by the reflector illustrated in FIGS. 2 and 2a.

The pattern can vary depending on the number and angle of the trapezoid shaped segments as well as the location and arrangement of the electromagnetic source. In some embodiments the arrangement of the trapezoid segments is done to optimize uniform distribution of the electromagnetic waves at the target area, while in other embodiments it may be advantageous to have higher concentration of the electromagnetic waves in some areas at the target.

Figure 3:
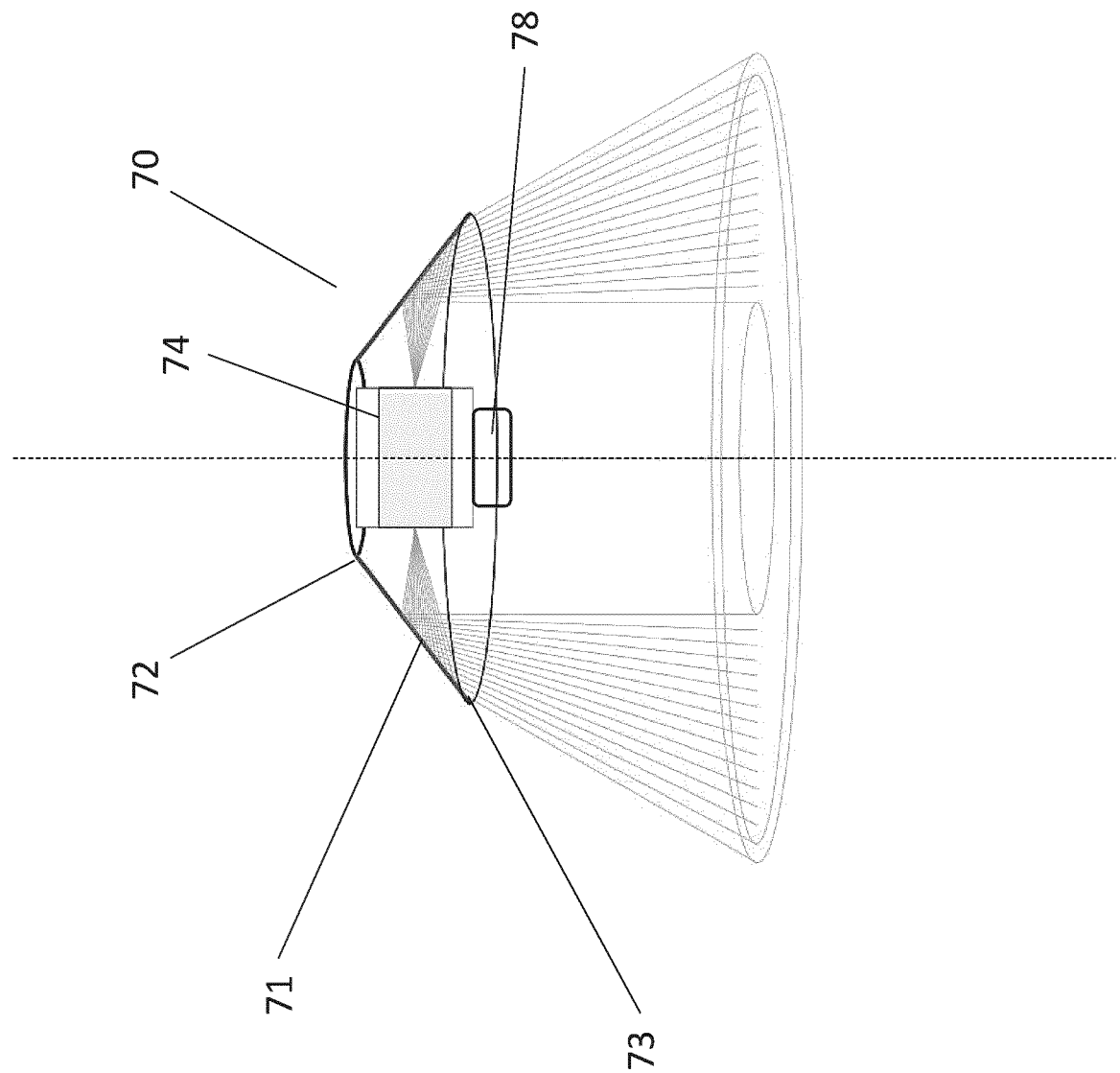
FIG. 3 illustrates an embodiment of a reflector, electromagnetic wave source and sensor device.

FIG. 3 shows an embodiment of a reflector 70 and electromagnetic wave source 74 similar to the one illustrated in FIG. 2. In this embodiment, however, a sensor device 78 is arranged above the electromagnetic wave source. The sensor device 78 may for example be a camera. In this embodiment it is illustrated one sensor device 78, but in other embodiments, there may be arranged multiple sensor devices, for example one sensor device assigned to each of the trapezoid segments. Each sensor device is positioned to have its field of view overlapping substantially with the full surface area of its assigned trapezoid segment. The multiple sensor devices may for example be arranged adjacent to each other forming a circular configuration, where the sensor devices are arranged radially.

In FIG. 2-3, each of the trapezoid segments are arranged with the same angle. In some embodiments, however, the trapezoid segments may be arranged with individual adapted angles. This can be used to optimize the distribution of the electromagnetic waves on the target. It may for example be desirable to have a higher density of electromagnetic waves in specific areas and lower density in other areas. In this way it may be created unique patterns and distribution of the electromagnetic waves for specific uses. Similarly, can the distribution of the electromagnetic waves on the target be adapted by designing the trapezoid segments with individual adapted width, such that all or some of the trapezoid segments have different width and thus size.

Figure 4:
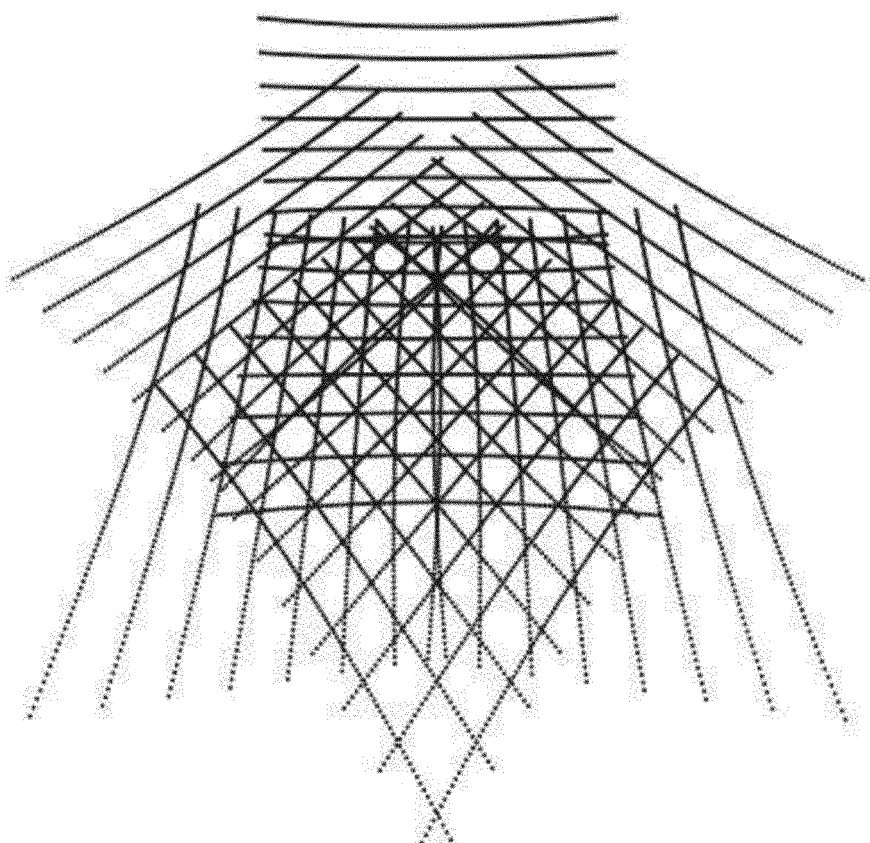
FIG. 4 illustrates another pattern formed by the electromagnetic waves at a target plane.

FIG. 4 illustrates the resulting pattern from the electromagnetic wave at a target plane if one half of the segments have a steeper angle than the other half of the segments.

Figure 5:
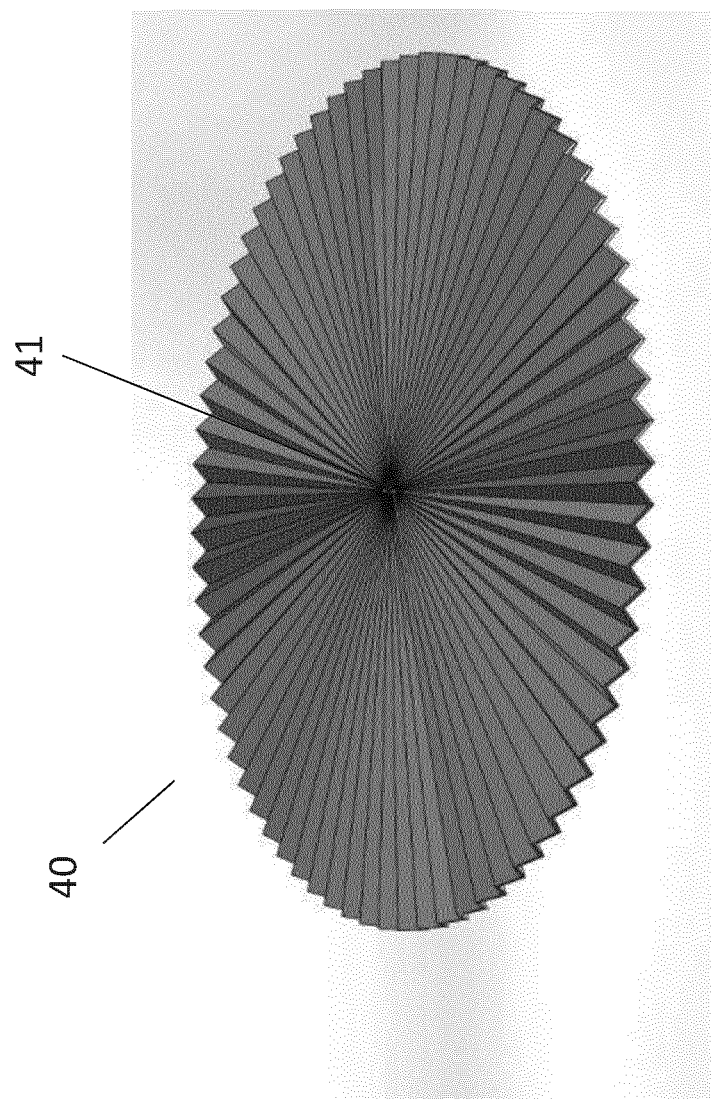
FIG. 5 illustrates the grooves of another embodiment of a reflector.

FIG. 5 illustrates another embodiment where the reflective screen 21 comprises a plurality of radially extending grooves on the inside, where each groove is formed by two reflective facets meeting at an edge. The electromagnetic waves are totally internally reflected at the two facets forming the grooves of the reflector and the waves are thus transferred from the source 24 towards a possible target arranged in front of the base of the truncated cone.

In FIG. 5 it is illustrated how grooves described above can be arranged in order to provide a cone. In this example, the truncated cone can be made from a flat film 40 where the grooves are formed in the flat film, and the film is cut and formed to provide a truncated cone for a reflective screen. The grooves all extend radially from the center 41. In this example, the resulting reflective screen will be adapted for arranging the rotating electromagnetic wave source centrally inside the reflective screen. If the screen should have been adapted for placing the rotating electromagnetic source off-center in the cone, the point from which the grooves would have extended could have been off-center to coincide with the center of the location of the rotating electromagnetic source.

Figure 6:
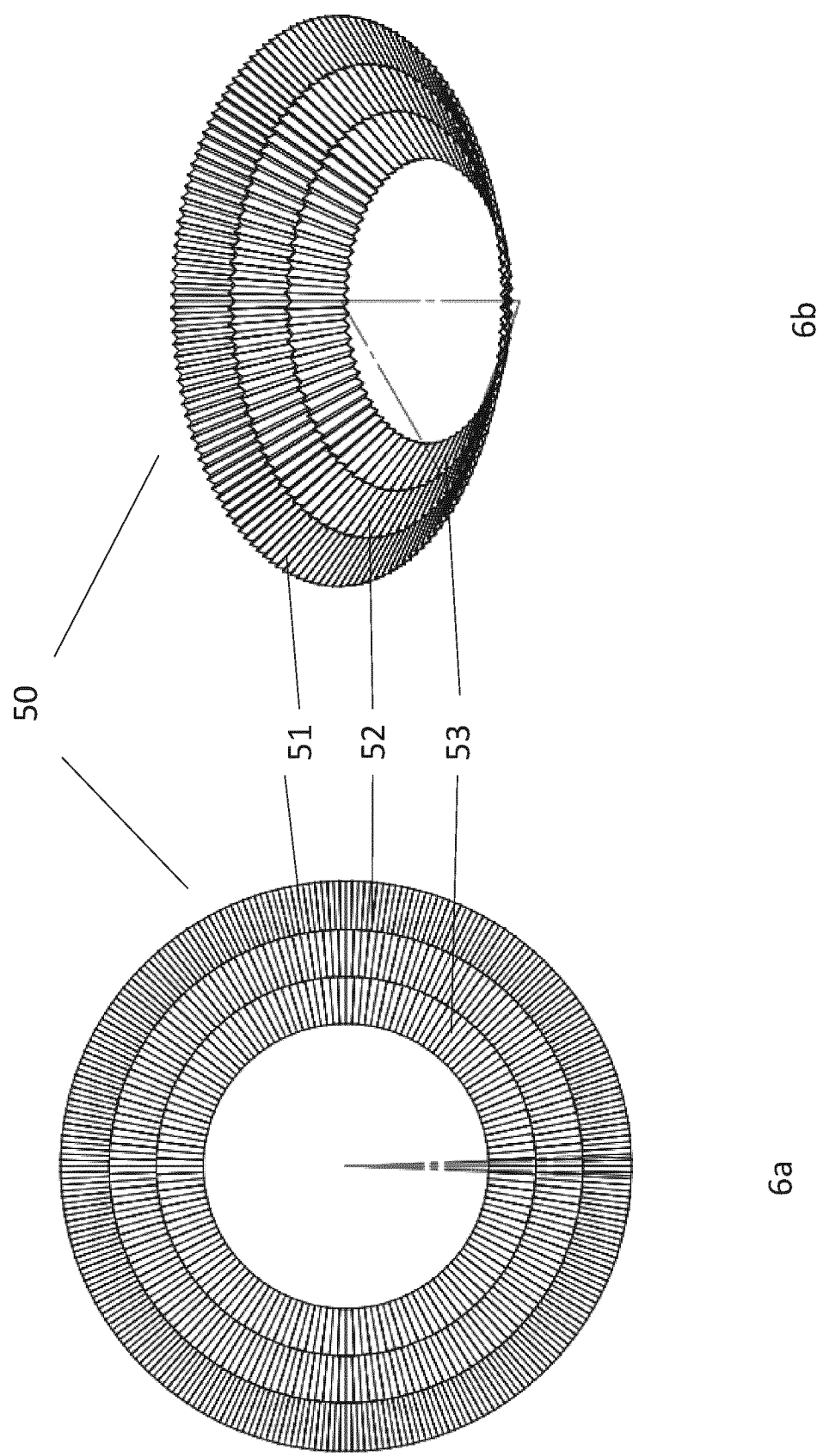
FIG. 6 illustrates an embodiment of a reflector comprising three sectors.

FIG. 6 illustrates an embodiment of a reflector 50 with grooves as the embodiment in FIG. 5 comprising three sectors 51, 52, 53. As discussed above, the angle between the reflective facets is constant over the length of the groove. Therefore, to avoid that the depth of the groove is too large at the base of the truncated cone, the reflective screen is divided into three sectors 51, 52, 53. In the figure, the boundary between the sectors can be seen along the circumference of the truncated cone. The number of sectors may vary depending on the size of the screen. Each sector comprises a set of radially extending grooves. The number of sectors may also be adapted to the desired depth of the grooves, as more sectors will enable more shallow grooves. The embodiment described above comprising trapezoid shaped segments in the reflector may similarly be provided with sectors, for example with some of or each sector having a different slant angle to adapt the reflector to a specific use and/or to provide a desired wave pattern at the target.

Figure 7:
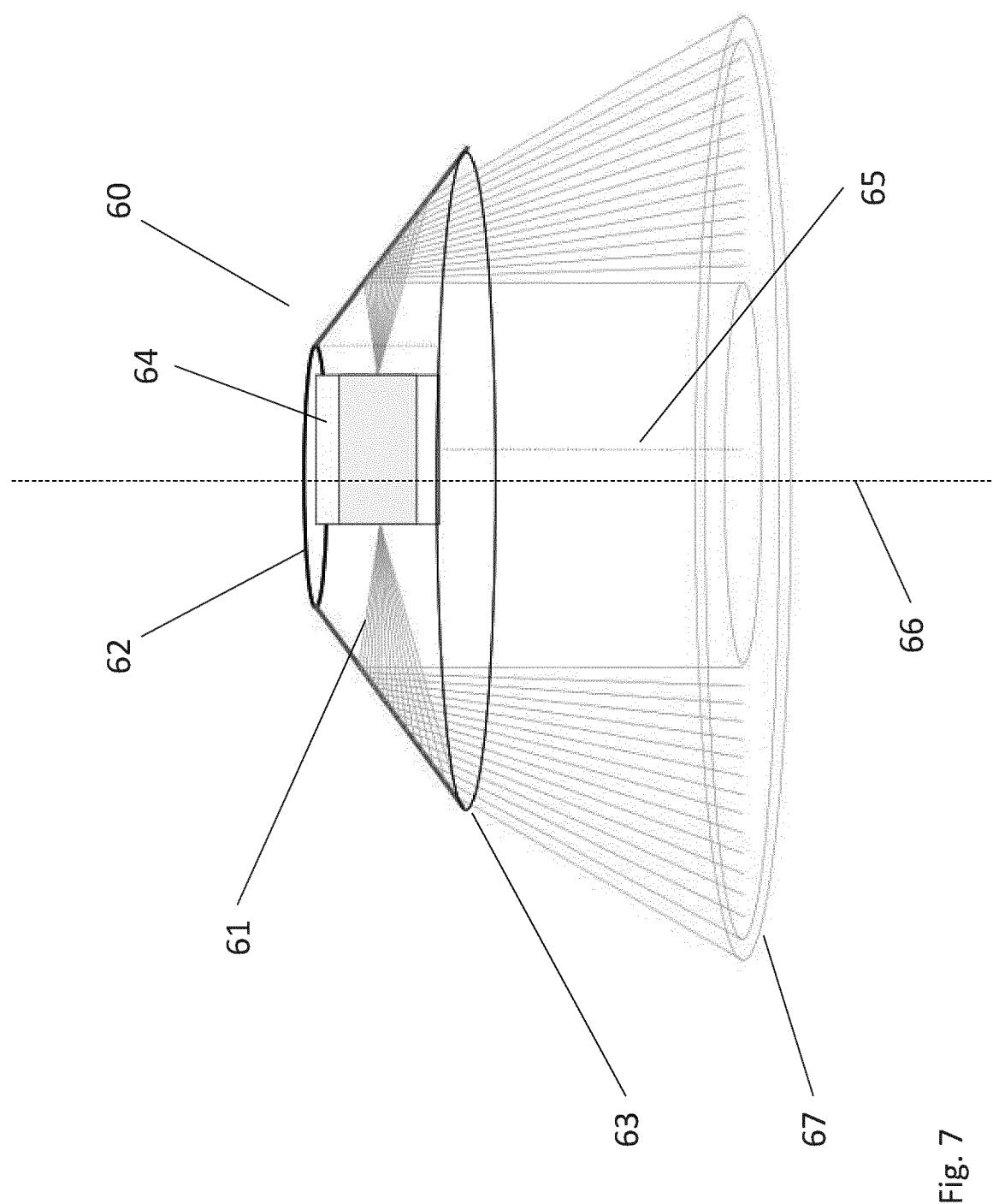
FIG. 7 illustrates another embodiment of a reflector according to the invention

FIG. 7 illustrates another embodiment of a reflector 60 according to the invention. In this embodiment, the reflector 60 comprises a reflective screen 61 which is shaped as a hollow truncated cone having a top 62 at the truncated end and a base 63 at the opposite end of the truncated end. The radius of the top 62 is smaller than the radius of the base 63.

The reflective screen 61 has a reflective material at the inside walls of the hollow cone. The inside of the hollow cone forms a cavity, and a rotating electromagnetic wave source 64 is arranged in the cavity, emitting electromagnetic waves towards the reflective material of the inside walls. The rotating electromagnetic wave source 64 is arranged off-center inside the cavity, i.e. the center axis 65 of the electromagnetic wave source is offset with respect to the center axis/symmetry axis 66 of the hollow truncated cone 61.

As in FIG. 3, the reflective screen 61 comprises in this embodiment a plurality of radially extending grooves on the inside, where each groove is formed by two reflective facets meeting at an edge. As the reflective screen is in this embodiment adapted for an off-center placement of the rotating electromagnetic wave source, the grooves may be formed to be radially extending from the off-center axis 65. The electromagnetic waves are totally internally reflected at the facets forming the grooves of the reflector and the waves are thus transferred from the source 64 towards a possible target arranged in front of the base of the truncated cone. As the electromagnetic wave source 64 rotates, the reflections reflected off the grooves will be distributed as "points" forming an imaginary line 67 in an imaginary target plane. As the source is arranged off-center the points will form an ellipsoidal pattern of reflected light/waves.

The invention claimed is:

1. Reflector for reflecting electromagnetic waves from a rotating electromagnetic wave source, comprising
a reflective screen being shaped as a hollow truncated cone having a top at the truncated end and a base, where the radius of the top is smaller than the radius of the base, where the hollow truncated cone comprises a plurality of trapezoid shaped segments and a reflective material is arranged inside the hollow cone on the trapezoid shaped segments, and where all or some of the trapezoid shaped segments have a different individual adapted slant angle inside the cone or all or some of the trapezoid segments have different individual adapted width, to optimize the distribution of the electromagnetic waves on the target.

2. Reflector according to claim 1, where the trapezoid shaped segments are arranged with their broad base at the base of the hollow truncated cone.

3. Reflector according to claim 1, where the slant angle of the cone is adapted to be operative to transfer electromagnetic waves between the electromagnetic wave source arranged in the top of the truncated cone and a target in front of the base of the truncated cone, wherein electromagnetic waves from the source is reflected at the trapezoid shaped segments of the reflector and directed to the target.

4. Reflector according to claim 1, where the slant angle of the cone is adapted to be operative to transfer electromagnetic waves between the electromagnetic wave source arranged in the center of the top of the truncated cone and a target in front of the base of the truncated cone, wherein electromagnetic waves from the source are reflected at the trapezoid shaped segment of the reflector and directed to the target.

5. Reflector according to claim 1, where there are eight trapezoid shaped segments.

6. Reflector according to claim 1, where the rotating electromagnetic wave source is a rotating lidar.

7. Arrangement comprising a rotating electromagnetic wave source and a reflector according to claim 1, where the rotating electromagnetic wave source is arranged in the top portion of the truncated cone, transmitting a beam of electromagnetic waves having a beam width towards trapezoid shaped segments, wherein the electromagnetic waves are reflected at the trapezoid shaped segments of the reflector.

8. Arrangement according to claim 7, where the source is arranged in the center of the top portion of the truncated cone.

9. Arrangement according to claim 7, where the source is arranged off-center in the top portion of the truncated cone.

10. Arrangement according to claim 7, further comprising at least one sensor device.

11. Arrangement according to claim 10, where a sensor device of the at least one sensor device is arranged axially to the electromagnetic wave source.

12. Arrangement according to claim 10 or 11, comprising one sensor device for each trapezoid shaped segment.

* * * * *